Dec. 29, 1953 M. I. DARROW ET AL Re. 23,758

POULTRY GIZZARD SKINNER

Original Filed Dec. 12, 1949

INVENTORS
Merritt I. Darrow
Guy R. Biddinger
William J. Patterson
BY
R. D. Story
ATTORNEY Reissued Dec. 29, 1953

Re. 23,758

UNITED STATES PATENT OFFICE 23,758

POULTRY GIZZARD SKINNER

Merritt I. Darrow, Chicago, Guy R. Biddinger, Bellwood, and William J. Patterson, La Grange, Ill., assignors to Swift & Company, Chicago, Ill., a corporation of Illinois Original No. 2,620,510, dated December 9, 1952, Serial No. 132,638, December 12, 1949. Application for reissue June 17, 1953, Serial No. 362,431

15 Claims. (Cl. 17—11)

Matter enclosed in heavy brackets [ ] appears in the original patent but forms no part of this reissue specification; matter printed in italics indicates the additions made by reissue.

The present invention relates to an apparatus for removing the lining from poultry gizzards.

In the dressing of poultry for the market, particularly that which is to be cut up, packaged, and frozen before distribution, it is desirable to have each portion of the bird completely prepared for cooking. The product is more salable if all the housewife has to do is to place it in the pans and cook it. To this end the gizzards of the birds are cut open and the inner lining of the gizzard removed before it is packaged and frozen.

The principal object of the present invention is the quick and easy removal of the gizzard linings to speed the processing of poultry and to reduce the cost that is involved. A prototype of the present invention operated under normal plant condition will remove the linings of from 1200 to 1300 gizzards per hour. The saving in labor cost for a nominal capital expenditure is substantial and many of the employes presently working at this task may be transferred to other duties in connection with the processing of the poultry.

Other objects and advantages include: a device which is sufficiently simple to operate so that no special skills or operations are required of the employes; a device which will not clog or jam and which is simple and easy to clean at the end of a period of use; a device that is readily adapted for use with a power feed mechanism to carry the gizzards to and through the device; a device that is low in initial cost; and a device that will have little wear and requires substantially no maintenance.

Additional objects and advantages will become apparent from the following description taken in conjunction with the drawings in which.

Figure 1:
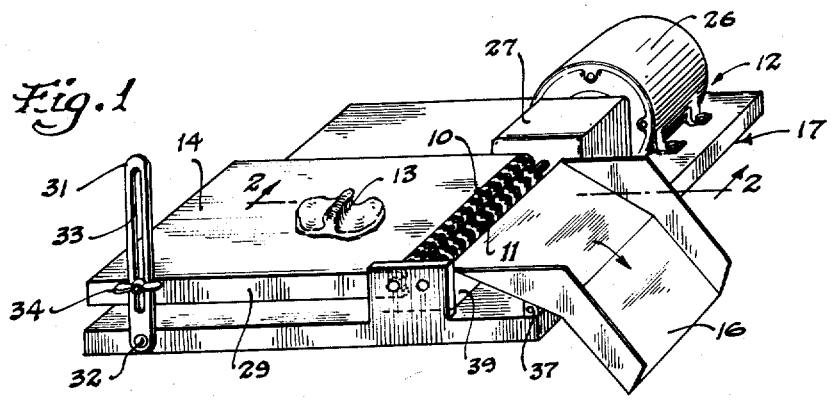
Fig. 1 is a perspective view of an embodiment of the invention.
Figure 2:
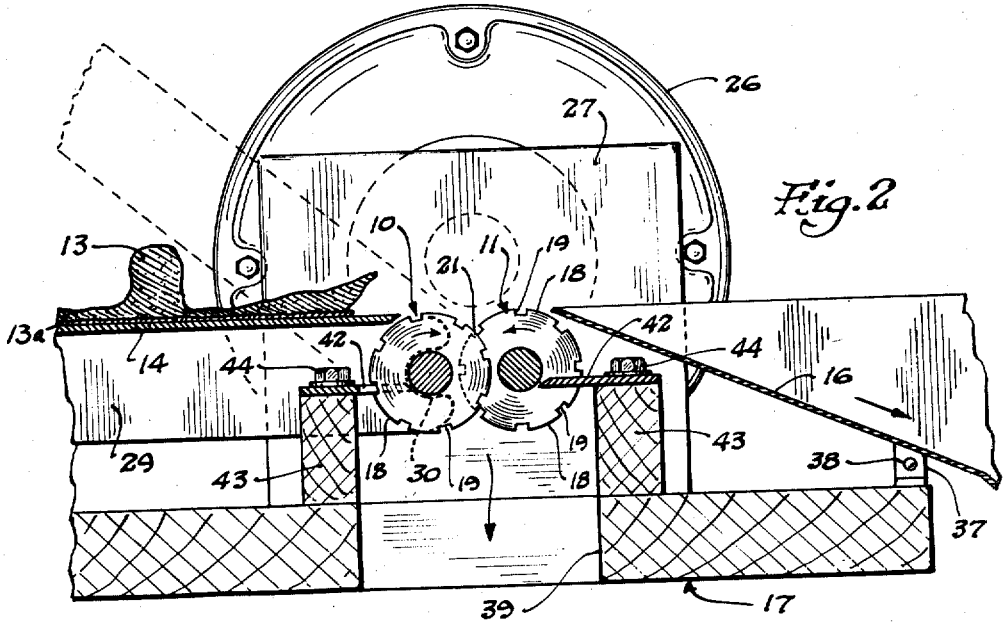
Fig. 2 is an enlarged elevational section taken on the line 2—2 of Fig. 1, looking in the direction of the arrows, with parts broken away and showing the feed plate in dotted lines in adjusted position.

As illustrated in Figs. 1 and 2, our invention includes a pair of rollers 10 and 11 which are rotated in opposite directions by a power means, generally 12. The gizzard 13, which has been cut open, is placed with the lining 13*a* down on a feed plate 14 over which the gizzard is moved to the rollers 10 and 11. After the gizzard lining has been removed, it is discharged over a conveyor or chute 16. The various parts of the device are mounted on a frame, generally 17.

Each of the rollers 10 and 11 is formed with a plurality of spaced annular ridges 18 having a generally cylindrical configuration and having two sides and a gizzard supporting surface on the periphery between the two sides. The rollers are journaled in frame 17 in such a position that the ridges of one of the rollers interdigitate with the ridges of the other of the rollers as illustrated particularly in Fig. 3. *The portion of the frame within which the rollers are journaled forms a bearing means for the rollers with the portions of the rollers journaled therein forming an axle means for the rollers.*

Ridges 18 are slightly smaller in thickness than the width of the grooves, the intermediate spaces between the ridges. The maximum radius of the generally cylindrical ridge plus the maximum radius of the portion of the shaft intermediate of the ridges is slightly less than the distance between the longitudinal axes of the two rollers. Thus, a clearance is provided on all sides between the interdigitating pairs of ridges. A clearance of approximately .003 of an inch between the periphery of the ridges and the bottom of the grooves, and .0015 of an inch between the sides of adjacent interdigitating ridges will be found to be satisfactory although this may be varied somewhat in some embodiments of the invention.

Figure 3:
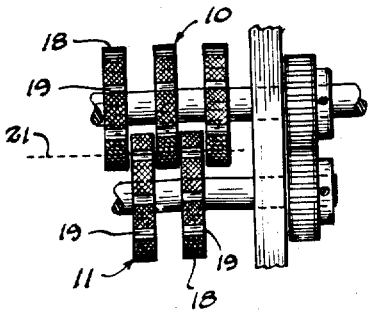
Fig. 3 is a plan view of a portion of the pulling rollers.

The peripheries of the ridges 18 are knurled and have a plurality of transverse notches 19 cut therein. The notches 19 in adjacent ridges 18 are staggered as illustrated in Fig. 3. The size of the notches is approximately $\frac{1}{16}''$ wide and $\frac{1}{32}''$ deep.

In some embodiments of the invention the knurling or use of the notches 19, or both, may be disposed of. Rollers which do not have a roughened surface at the periphery of the ridges are safer in use because there is little likelihood of tearing or otherwise abrading the fingers of the operators who are feeding the material into the machine.

However, the lack of the roughened surface slows down the operation of the machine inasmuch as the operator is required to take additional time to insert an edge of the gizzard lining into the line of juncture 21 between the rollers. Furthermore, should only a portion of the lining be torn off, as sometimes happens, the operator must again insert an edge of the remaining lining into the line of juncture 21 to remove the remainder of the lining.

When the peripheries of the rollers are roughened, as illustrated in Fig. 3, feeding of the skin into the line of juncture is automatically performed by the contact with the rollers. Even if only a portion of the lining should be initially removed, the rollers will again catch the remainder of the lining and pull it between the rollers.

The power means 12 includes an electric motor 26 and a suitable gear mechanism in gear case 27. Rollers 10 and 11 are connected to the gearing within case 27 so that the rollers will rotate in opposite directions with the rollers turning inwardly toward each other in the area across which the gizzard is passed for the lining to be removed. The rolls preferably turn at a relatively low speed (about 230 R. P. M.) although the exact speed is not particularly critical and may be varied within reasonable limits.

Feed plate 14 is formed with a pair of side members 29 having a rounded nose with an opening 30 therein to fit around the shaft portion of roller 10. This structure permits the feed plate 14 to be pivoted about substantially the same axis as the longitudinal axis of roller 10 and maintained approximately parallel to the roller axis. A bracket 31 attached at one end to frame 17 by means of a pin 32 permits the angle of the table to be fixed with respect to the pair of rollers 10 and 11. Bracket 31 has a slot 33 to receive a clamping bolt and a wing nut 34 in a well known manner. By loosening the wing nut 34 the feed plate 14 may be raised or lowered to a desired angle. If the incline of plate 14 is sufficient the gizzards 13 may be moved down the plate 14 by gravity.

As the pair of rollers grasp the gizzard lining and pull it away from the gizzard down between the pair of rollers, the gizzard is supported by the top of the rollers and is moved across from feed plate 14 to the discharge conveyor or chute 16. The chute is attached to frame 17, as by means of a two piece bracket 37 having a connecting pin 38 therein. The chute 16 may be pivoted about pin 38 with respect to frame 17. The ability to pivot the chute away from the pair of rollers facilitates the cleaning of the machine at the end of a period of use. The gizzards are discharged down the chute into a suitable receptacle (not shown) by means of gravity. Below the rollers there is provided an opening 39 in frame 17 to allow the linings to fall into a suitable receptacle (not shown).

To facilitate the cleaning of the machine and to strip any linings from the rollers should the former tend to stick to the rollers and revolve therewith there is provided a pair of combs 42 which contact the shaft portions of the rollers intermediate of the ridges 18. The combs are mounted on pillars 43 of frame 17 and are attached thereto by stud bolts 44 so that the combs may be removed for cleaning if so desired.

As has previously been explained, the feed plate 14 may be inclined to allow the plate to act as a gravity conveyor to feed the opened gizzards 13 to the rollers. It will be apparent that with feed plate 14 in a horizontal position a number of power mechanical conveying devices may be used to move the gizzards to the rollers. With a roughened periphery on the rollers the hand feeding of gizzards to the rollers is not recommended because of the danger of injury to the operator. Since the rollers do take a hold of the lining and move it down to the line of juncture 21 where it can be securely gripped between the interdigitating ridges, power feeding means may be readily used and an operator is not required to insert an edge of the lining between the rollers.

If the gizzard is allowed to remain on top of the rollers, an abrading action will take place. However, the removal of the gizzard lining is accomplished by reason of the lining becoming pinched between the adjacent ridges of the rollers and being pulled from the gizzard proper down through the pair of interdigitating rollers where it is discharged through opening 39. By reason of this action the lining is removed without any material deleterious action on the gizzard proper.

We claim:

1. A device for removing the lining from poultry gizzards, said device including a frame, a pair of rollers each having a plurality of spaced annular ridges thereabout, said ridges having two sides and a gizzard supporting surface on the periphery between the two sides, said rollers being journaled in said frame with the ridges of one roller interdigitating with the ridges of the other roller with the sides of the ridges of one roller immediately adjacent the sides of the ridges of the other roller with an interstice therebetween, and power means connected to said rollers to rotate said rollers in opposite directions of rotation.

2. In a device for removing the lining from poultry gizzards, a pair of rollers, each of said rollers having a plurality of annular ridges thereabout forming grooves therebetween with the ridges of one roller fitting into the grooves of the other roller, said ridges having a face, at least a portion of which is generally parallel to the roller, and being only slightly smaller in thickness than the distance between the two ridges on the other roller with which it interdigitates to provide a small clearance between adjacent interdigitating ridges, the radius of each of said ridges plus the radius at the base of the groove into which the ridge fits being slightly smaller than the distance between the longitudinal axes of the two rollers, and power means connected to said rollers to rotate said rollers in opposite directions of rotation.

3. A device for removing the lining from poultry gizzards, said device including a frame, a pair of rollers each having a plurality of spaced annular ridges thereabout, said ridges having two sides and a gizzard supporting surface on the periphery between the two sides, said rollers being journaled in said frame with the ridges of one roller interdigitating with the ridges of the other roller with the sides of the ridges of one roller immediately adjacent the sides of the ridges of the other roller with an interstice therebetween, power means connected to said rollers to rotate said rollers in opposite directions of rotation, a feed plate adjacent one side of one of said rollers, projecting generally away from the other of the rollers, and in a plane substantially parallel to the longitudinal axis of said rollers whereby opened gizzards may be moved with the lining down across said plate to said rollers where the rollers will grip said lining and pull it between the rollers away from the gizzard, and means to the other side of said rollers to receive the processed gizzards and to direct them into a suitable receptacle.

4. A device for removing the lining from poultry gizzards, said device including a frame, a pair of rollers each having a plurality of spaced annular ridges thereabout, said ridges having two sides and a gizzard supporting surface on the periphery between the two sides, said rollers being journaled in said frame with the ridges of one roller interdigitating with the ridges of the other roller with the sides of the ridges of one roller immediately adjacent the sides of the ridges of the other roller with an interstice therebetween, power means connected to said rollers to rotate said rollers in opposite directions of rotation, a feed plate adjacent one side of one of said rollers, projecting generally away from the other of the rollers, and in a plane substantially parallel to the longitudinal axis of said rollers whereby opened gizzards may be moved with the lining down across said plate to said rollers where the rollers will grip said lining and pull it between the rollers away from the gizzard, said plate being rotative about an axis substantially coinciding with the longitudinal axis of said one roller, means to hold said plate in various positions of rotation, and means to the other side of said rollers to receive the processed gizzards and to direct them into a suitable receptacle.

5. A device for removing the lining from poultry gizzards, said device including a frame, a pair of rollers each having a plurality of spaced annular ridges thereabout, said ridges having two sides and a gizzard supporting surface on the periphery between the two sides, said rollers being journaled in said frame with the ridges of one roller interdigitating with the ridges of the other roller with the sides of the ridges of one roller immediately adjacent the sides of the ridges of the other roller with an interstice therebetween, power means connected to said rollers to rotate said rollers in opposite directions of rotation, a feed plate adjacent one side of one of said rollers, projecting generally away from the other of the rollers, and in a plane substantially parallel to the longitudinal axis of said rollers whereby opened gizzards may be moved with the lining down across said plate to said rollers where the rollers will grip said lining and pull it between the rollers away from the gizzard, said frame having an opening therein below said rollers to allow said linings to drop therethrough and a discharge conveyor to the other side of the other of said rollers to receive the processed gizzards.

6. A device for removing the lining from poultry gizzards, said device including a frame, a pair of rollers each having a plurality of spaced annular ridges thereabout, said ridges having two sides and a gizzard supporting surface on the periphery between the two sides, said rollers being journaled in said frame with the ridges of one roller interdigitating with the ridges of the other roller with the sides of the ridges of one roller immediately adjacent the sides of the ridges of the other roller with an interstice therebetween, power means connected to said rollers to rotate said rollers in opposite directions of rotation, and a comb meshing with each of said rollers to strip the rollers of material tending to adhere thereto.

7. A device for removing the lining from poultry gizzards, said device including a frame, a pair of rollers each having a plurality of spaced annular ridges thereabout, said ridges having two sides and a gizzard supporting surface about the periphery between the two sides, said ridges having a roughened periphery, said rollers being journaled in said frame with the ridges of one roller interdigitating with the ridges of the other roller with the sides of the ridges of one roller immediately adjacent the sides of the ridges of the other roller with an interstice therebetween, and power means connected to said rollers to rotate said rollers in opposite directions of rotation.

8. A device for removing the lining from poultry gizzards, said device including a frame, a pair of rollers each having a plurality of spaced annular ridges thereabout, said rollers being journaled in said frame with the ridges of one roller interdigitating with the ridges of the other roller, said ridges having a gizzard supporting surface on the periphery thereof and a plurality of grooves across said surface, said grooves being positioned substantially parallel to the axis of the roller, the portions of said periphery intermediate said grooves being knurled, the ridges of each roller being only slightly smaller in thickness than the distance between the ridges of the other roller to form an interstice therebetween, and power means connected to said rollers to rotate said rollers in opposite directions of rotation.

9. A device for removing the lining from poultry gizzards, said device including a frame, a pair of rollers each having a plurality of spaced annular ridges thereabout, said ridges having a gizzard supporting surface on the periphery thereof and with transverse grooves spaced about said surface, said ridges having a pair of sides transverse to said roller, said rollers being journaled in said frame with the ridges of one roller interdigitating with the ridges of the other roller with the sides of the ridges of one roller immediately adjacent the sides of the ridges of the other roller with an interstice therebetween, and power means connected to said rollers to rotate said rollers in opposite directions of rotation.

10. A device for removing the lining from poultry gizzards, said device including a frame, a pair of rollers journaled in said frame, each of said rollers having a plurality of annular ridges thereabout forming grooves therebetween with the ridges of one roller fitting into the grooves of the other roller, said ridges having a face, at least a portion of which is generally parallel to the roller, each of said ridges being only slightly smaller in thickness than the distance between the two ridges with which it interdigitates on the other roller to provide a small clearance between the sides of adjacent interdigitating ridges, the radius of each of said ridges plus the radius at the base of the groove into which the ridge fits being slightly smaller than the distance between the longitudinal axes of the two rollers to provide a small clearance between the ridge and the base of the groove, said ridges having a plurality of notches in the periphery thereof, the notches in the ridges of one roller being staggered with respect to the notches in the ridges of the other roller, the portions of said periphery intermediate said notches being knurled, plates projecting to either side of the upper portions of said two rollers in planes substantially parallel to the longitudinal axes of said rollers, and power means connected to said rollers to rotate said rollers in opposite directions with the interdigitating portions of the rollers turning downwardly.

11. A device for removing the lining from poultry gizzards, said device including a frame, a pair of rollers, each of said rollers having a plurality of annular ridges thereabout forming grooves therebetween, said rollers being journaled in said frame with the ridges of one roller fitting into the grooves of the other roller, said ridges having a face at least a portion of which is generally parallel to the roller, each of said ridges being only slightly smaller in thickness than the distance between the two ridges on the other roller with which it interdigitates to provide only a small clearance between adjacent interdigitating ridges, said ridges having a plurality of transverse grooves in the face thereof, said face intermediate of said grooves being knurled, and power means connected to said rollers to rotate said rollers in opposite directions of rotation.

12. In a device for removing the lining from poultry gizzards, a pair of rollers, each of said rollers having a plurality of annular-like ridges thereabout forming grooves therebetween with the ridges of one roller fitting into the grooves of the other roller, said ridges having a face, at least one portion of which is generally parallel to the roller, and being only slightly smaller in thickness than the distance between the two ridges of the other roller with which it interdigitates to provide a small clearance between adjacent interdigitating ridges, and power means connected to said rollers to rotate said rollers in opposite directions of rotation.

*13. A pair of rollers for use with a frame having bearings thereon and a power means to rotate said rollers in opposite directions of rotation, each of said rollers having a plurality of spaced annular ridges of generally cylindrical configuration thereabout, said ridges having two sides and a gizzard supporting surface on the periphery between the two sides, said rollers having axle means projecting from the rollers whereby said rollers may be mounted in said bearings with the ridges of one roller interdigitating with the ridges of the other roller, the distance between said two sides of each ridge being only slightly smaller than the distance between the two ridges with which the ridge interdigitates to provide a small clearance between the adjacent interdigitating ridges.*

*14. A pair of rollers for use with a frame having bearings thereon and a power means to rotate said rollers in opposite directions of rotation, each of said rollers having a plurality of spaced annular-like ridges thereabout, said ridges having two sides and a gizzard supporting surface on the periphery between the two sides, said surface being generally convex, said rollers having axle means projecting from the rollers whereby said rollers may be mounted in said bearings with the ridges of one roller interdigitating with the ridges of the other roller, the distance between said two sides of each ridge being only slightly smaller than the distance between the two ridges with which the ridge interdigitates to provide a small clearance between the adjacent interdigitating ridges.*

*15. A device for removing the lining from poultry gizzards, said device including a frame, a pair of rollers each having a plurality of spaced annular ridges of generally cylindrical configuration thereabout, said ridges having two sides and a gizzard supporting surface on the periphery between the two sides, said rollers being journaled in said frame with the ridges of one roller interdigitating with the ridges of the other roller with the sides of the ridges of one roller immediately adjacent the sides of the ridges of the other roller with an interstice therebetween in the order of about .0015 of an inch, and power means connected to said rollers to rotate said rollers in opposite directions of rotation.*

MERRITT I. DARROW.
GUY R. BIDDINGER.
WILLIAM J. PATTERSON.

References Cited in the file of this patent or the original patent

UNITED STATES PATENTS

| Number | Name | Date |
|---|---|---|
| 625,739 | Buerk | May 30, 1899 |
| 2,008,326 | Harvey | July 16, 1935 |
| 2,103,002 | Faber | Dec. 21, 1937 |
| 2,150,192 | Sander | Mar. 14, 1939 |
| 2,171,611 | Tolman et al. | Sept. 5, 1939 |
| 2,251,801 | Plitt, Sr., et al. | Aug. 5, 1941 |
| 2,290,812 | Norman | July 21, 1942 |
| 2,398,636 | Henney et al. | Apr. 16, 1946 |
| 2,477,289 | De Moss | July 26, 1949 |
| 2,493,707 | Weber | Jan. 3, 1950 |
| 2,545,718 | Weber | Mar. 20, 1951 |

FOREIGN PATENTS

| Number | Country | Date |
|---|---|---|
| 179,385 | Germany | Dec. 1, 1906 |